(12) United States Patent
Lawton et al.

(10) Patent No.: US 6,350,515 B1
(45) Date of Patent: Feb. 26, 2002

(54) BIOMOLECULAR SYNTHESIS OF QUANTUM DOT COMPOSITES

(75) Inventors: Carl Lawton, Chelmsford; Suzanne Conroy, Dracut, both of MA (US)

(73) Assignee: University of Massachussetts Lowell, Lowell, MA (US)

( * ) Notice: Subject to any disclaimer, the term of this patent is extended or adjusted under 35 U.S.C. 154(b) by 0 days.

(21) Appl. No.: 09/407,749

(22) Filed: Sep. 28, 1999

Related U.S. Application Data

(60) Division of application No. 08/902,866, filed on Jul. 30, 1997, now Pat. No. 5,985,353, which is a continuation of application No. 08/386,562, filed on Feb. 10, 1995, now abandoned, which is a continuation-in-part of application No. 08/348,517, filed on Dec. 1, 1994, now abandoned.

(51) Int. Cl.[7] ................................. B32B 5/16
(52) U.S. Cl. ................ 428/323; 428/328; 428/332; 428/339; 428/411.1
(58) Field of Search ................ 428/323, 328, 428/332, 339, 411.1

(56) References Cited

U.S. PATENT DOCUMENTS

| | | | | |
|---|---|---|---|---|
| 5,215,822 A | * | 6/1993 | Wyman et al. | 428/447 |
| 5,567,564 A | * | 10/1996 | Ziolo | 430/115 |
| 5,571,612 A | * | 11/1996 | Motohiro et al. | 428/323 |
| 5,585,640 A | * | 12/1996 | Huston et al. | 250/483.1 |
| 5,882,779 A | * | 3/1999 | Lawandy | 428/323 |

OTHER PUBLICATIONS

Lawton, C. W., Fiddy, M. A., Flynn, G., Aboughanem, F., Mat. Res. Symp. Proc., 330, 283–288 (1994).*

* cited by examiner

Primary Examiner—Stevan A. Resan
Assistant Examiner—Kevin M. Bernatz
(74) Attorney, Agent, or Firm—Hamilton, Brook, Smith & Reynolds, P.C.

(57) ABSTRACT

A biomimetic approach utilizing biomolecular self-assembly is described to form nanometer particle size composites for uses, such as, nonlinear optical media. Yeast tRNA was utilized as an ion-exchange/nucleation site within a polymeric matrix (polyacrylamide). Cadmium ion-exchange and subsequent sulfide precipitation resulted in formation of nanometer particle size composites. Illumination of samples with an Argon laster (514 nm) utilizing the Z-scan measurement method resulted in third order nonlinearity $\chi^3$ values of +2.7×10$^{-6}$ esu.

25 Claims, 4 Drawing Sheets

BIOMOLECULAR SYNTHESIS OF QUANTUM DOT COMPOSITES

RELATED APPLICATIONS

This application is a divisional of U.S. Ser. No. 08/902,866, filed Jul. 30, 1997, now U.S. Pat. No. 5,985,353, which is a filewrapper continuation of U.S. Ser. No. 08/386,562, filed Feb. 10, 1995, now abandoned, which is a continuation-in-part of U.S. Ser. No. 08/348,517, filed Dec. 1, 1994, now abandoned, the entire teachings of which are incorporated herein by reference.

BACKGROUND OF THE INVENTION

Nanometer size or so-called Quantum-dot size particle composites can exhibit large optical nonlinearities which make them of interest for many applications such as optically addressed switching and thresholding. They are also inexpensive and could support array addressing. An important advantage of these kinds of nonlinear media is that they can be produced in bulk and one has control over the particle type, size, shape and concentration. One can also select the host medium in which the particles are placed. Further, depending on the particular physical mechanism exploited for the bulk material's nonlinear properties, one has a choice of response times from picoseconds to seconds. Indeed, by engineering a material to have nonlinear properties arising from two different physical mechanisms, bistable behavior is expected. These many degrees of freedom permit the fine tuning of the optical nonlinearity in order to tailor it for specific applications. This produces a degree of flexibility not offered by alternative nonlinear media.

Biomolecular self-assembly holds the potential for developing advanced material properties in semiconductors and metals by controlling crystal structure, crystal size, and orientation of crystal growth. This control is important because many electrical and optical properties are highly anisotropic or size dependent. Biomineralization is one aspect of biomolecular self-assembly where there is a consensus among workers that general principles apply to most systems through the use of a polymer matrix and charged nucleation sites to control crystal growth. Shells, teeth, and bone are constructed in this manner. In mammalian teeth, calcium phosphate is organized as long thin needles in an acidic protein matrix. Biological control of inorganic nanoparticle formation has recently been shown to occur as a byproduct of cadmium detoxification in the yeasts *Candida glabrata* and *Schizosaccharomyces pombe*. An in vitro process of producing nanoparticle CdS was demonstrated in 1990 utilizing short alpha linkage peptides ($\alpha$-glutamic acid-cysteine)$_4$-gly. These nanoparticles have been characterized and show a sharp blue-shifted absorption peak at 295 nm indicative of quantum confinement and particle uniformity. A major limitation of this biomolecular approach is the inability to tailor the particles for specific sizes and economic feasibility. Nanometer size particles have been found in polymers, glass and zeolites.

Two different methods have been developed to form nanometer-size particles within polymers. In the first method a soluble metal salt is co-dissolved in a suitable solvent along with a polymer which is then cast into a film. In the second method metal ions are ion-exchanged into a solid polymer. Precipitation within the polymer ($H_2S$, NaOH) generates nanoparticles. Cadmium and lead sulfide have been formed in Nafion using the ion-exchange technique. This basic process has been extended recently to the formation of $\gamma$-$Fe_2O_3$ nanoparticles that resulted in transparent magnetic materials. Iron salts were ion-exchanged into commercial ion-exchange resins and subsequently precipitated by intermediate hydroxide formation and further oxidation. Each method results in a polydisperse nanoparticle distribution.

The three-dimensional porous crystalline host, zeolites, have been utilized for nanoparticle formation. Particle size can be tailored by a change in zeolite chemistry which results in different size pore formation. Disadvantages include poor control of the fabrication process, instability in many solvents, and small crystal size which is unsuitable for non-linear optical applications.

Much interest was aroused in nanoparticles several years ago, because it was realized that such particles no longer exhibit the optical properties of the bulk material, but have size dependent properties. One can assume that the electrons or excitons in the material have momenta confined in the same way as for an elementary quantum mechanical particle-in-a-box problem. Quantum confinement is thus expected when a particle's radius is smaller than the size of the Bohr radius of the electron in the material from which the particle is made. Bohr radii can range from 0.1 Angstroms in a hydrogen atom to 80 Angstroms in germanium.

Interest in the use of microparticles for optical nonlinear media originated from the work of Jain and Lind in 1983 (*J. Opt. Soc. Amer., 73:647 (1983)*). They found this nonlinearity present in commercially available sharp-cut-off filters (e.g. from Corning or Schott) which contained nanocrystals of $CdS_xSe_{x-1}$. These composite glasses have been found to have a third order nonlinearity, $\chi^3$, of the order of $10^-$esu to $10^{-9}$ esu and response times of 1 ps to 0.1 ps. Several groups have reported larger nonlinearities from semiconductor copper chloride in glass with particle sizes ranging from 2.5 nm to 10 nm. Applications for such materials are to ultrahigh speed light controlled switching devices. Also, using metallic particles coated with or embedded in optically nonlinear dielectrics, each part of the structure has intrinsic nonlinearities and the one can be made to enhance the other, giving a predicted $\chi^3$ as large as $10^{-2}$ esu.

The first theoretical investigations of quantum confinement in semiconductor microcrystallites were reported by Efros and Efros and by Brus in the 1980's. They promoted the idea that by controlling the band-gap in materials, one can tune the wavelength of light emitted or absorbed. The band-gap depends upon particle size and shape and the overall optical properties depend upon particle number density, particle material properties and host fluid properties. A detailed theoretical analysis to determine the linear and third order susceptibilities of a small metal sphere was derived in 1986 under the assumption that a quantum confinement effect would dominate the optical properties. A spherical box model was adopted for the potential and the one electron Schrodinger equation was solved at absolute zero. The susceptibilities were calculated using the density matrix theory of Butcher and MacLean (Proc. Phys. Soc., 81:213 (1963)). Their final expression for $\chi^3$ takes the form $$\chi^3 = \mu(1/r^3)(e^4/[m^2\hbar^5w^7])(1-r/r_0)$$

Note that this particular mechanism suggests that $\chi^3$ increases as the cube of the inverse radius of the particle.

For this mechanism, the origin of the third order nonlinear susceptibility arises from the material's behavior as simple two level absorber. The absorption saturates when the upper state is half occupied and the refractive index becomes intensity dependent. One can associate an absorption profile for the material with a refractive index modulation, as determined by the Kramers-Kronig dispersion relations. With a limited number of participants in this absorption process, the absorption can be saturated and an intensity dependent refractive index variation will result. It is expected that this mechanism can become very large if the particle size distribution is small, leading to a very narrow absorption bandwidth and associated very large change in refractive index. Hence the wide interest in a method by which a monodisperse nanoparticle distribution can be fabricated.

As mentioned above, local field effects can provide a degree of feedback to the particle's behavior. By changing the refractive index of the particle, a further enhancement or reduction of the field within the particle occurs due to dielectric confinement variations. For small detunings from resonance, the field may be concentrated or expelled from the particle, depending on the change in refractive index. Hence the intensity inside the particle is modified which in turn changes the refractive index due to the nonlinearity. It is this feedback that can lead to regions of optical bistability. i.e. to intrinsic bistability.

These are effects which have not been explicitly observed, but are expected; once again, it is the lack of the very uniform size distribution of particles with a narrow absorption peak that is thought to be the experimental limitation. Consequently, a long standing need exists for a nanoparticle size particle composite with uniform particle size distribution and a narrow absorption peak.

SUMMARY OF THE INVENTION

The present invention relates to a process for forming nanometer size particles in a structure and compositions thereof.

In particular, the invention relates to a process for forming nanometer size particles in a structure which includes providing a charged interactive polymer (such as a biopolymer) of predetermined uniform molecular weight in a matrix and contacting a first charged element with the polymer under conditions suitable for forming uniform nanometer size particles. The interactive polymer can include, for example, a polypeptide or a nucleic acid.

In one embodiment, the process of forming nanometer size particles in a structure includes providing a charged polymer in a polymeric matrix. The first element is exchanged with the polymer to produce a quantity of ions of the first element. The ions are precipitated with a first compound having a second element to produce nanometer size particles of molecules of a second compound comprised of the first element and a second element.

The composite structure includes nanometer sized particles in a substrate with the particles being comprised of a compound of a first charged element and a precipitating element. The first charged element can be a cation and the precipitating element can be an anion or a reducing agent. Alternatively, the first charged element can be an anion which can be precipitated with a cation.

This invention has many advantages. For example, the biomolecular self-assembly techniques employed provide a method for fabricating composites which contain nanometer particles of uniform size and shape. The reactants employed to form the quantum dot composites are readily synthesized or available from naturally-occurrings sources, such as, for example, nucleic acids (such as RNA and DNA, natural or synthesized) or protein polymers (such as natural, recombinant or synthesized proteins or polypeptides). The composite films are stable. Additionally, the nanometer size particles formed in this manner can provide an enhanced index change and can yield a much larger effective $\chi^3$ than materials currently available.

DETAILED DESCRIPTION OF THE INVENTION

In accordance with the invention, a charged interactive polymer of predetermined uniform size, such as, a nucleic acid (e.g. tRNA) or polypeptide, is utilized as an ion-exchange nucleation site within a polymeric or gel matrix (e.g. polyacrylamide). The interactive polymers are preferably biopolymers formed by well-known synthetic methods or by isolation from natural sources wherein the interactive polymers possess a predetermined and/or uniform molecular weight. Such interactive polymers when employed in the instant invention and combined with cations result in precipitation of uniform size nanoparticles.

Suitable soluble cations include, for example, all heavy metals including lanthanides and actinides. A more preferred embodiment of the present invention includes transition metals, such as, for example, Cd, Ag, Fe, etc. Ion-exchange of the cation and subsequent precipitation with an appropriate anion or reducing agent in the presence of an interactive polymer results in nanoparticle formation. The precipitation can occur by addition of an appropriate anion or by the addition of electrons through chemical reduction.

Figure 1:
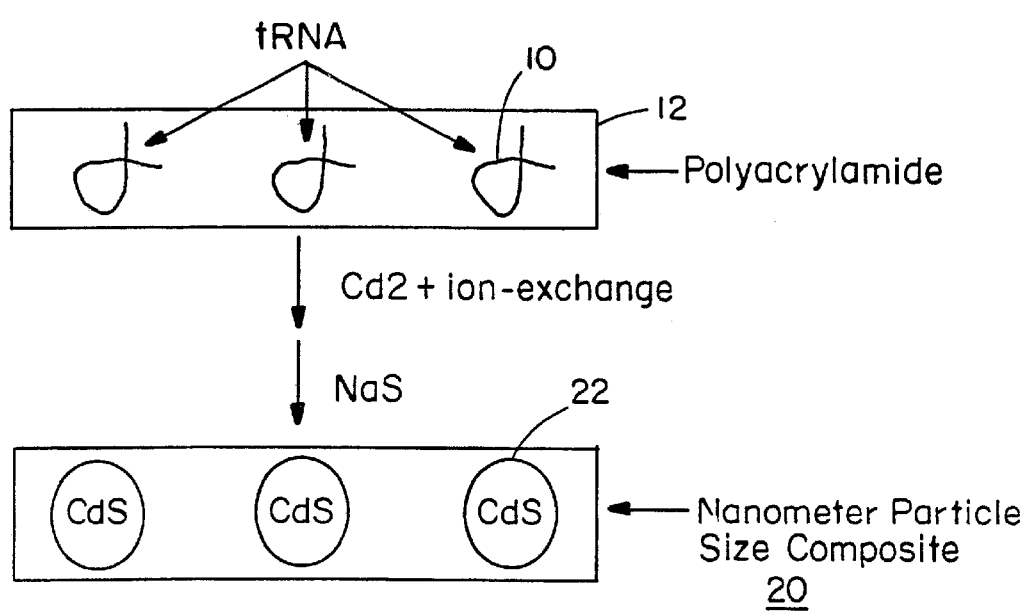
FIG. 1 is a schematic drawing of a method of construction of nanometer size particles in a composite structure.

A schematic of this process is shown in FIG. 1. Varying amounts of this interactive polymer 10 (e.g., tRNA) are dispersed in a gel matrix 12 such as polyacrylamide (10% acrylamide/bis-acrylamide 19:1) to form composite 20. For example, $Cd^{2+}$ (100 mM) can be ion exchanged in the presence of sulphide, washed twice with distilled water and precipitated as a compound (CdS) by a salt compound (NaS) (100 mM) or other appropriate reagents, and washed twice with distilled water resulting in nanoparticle size formation on composite 20. Yeast, tRNA (BRL) was chosen as the charged interactive polymer for this preliminary work because of commercial availability, cost and an approximate molecular weight distribution (23,000–27,000) that corresponds to 75–85 nucleotides which results in a narrow particle distribution. The importance of the gel matrix is to keep the newly formed nanoparticles from coalescing. Siloxanes can be used to enhance the adhesion of the gel to a solid support, such as a glass and/or quartz sapphire substrate.

Figure 2:
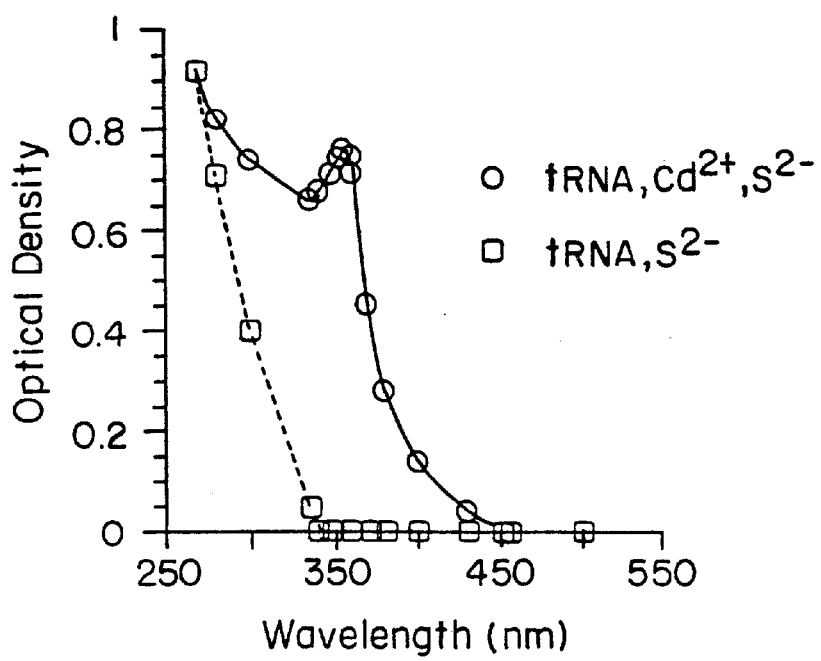
FIG. 2 depicts two plots of optical density versus wavelength in nanometers for 3.75 nmg. of tRNA (BRL) formed into a polyacrylamide composite. The curve formed of open circles is for a composite with $Cd^{2+}$ ion-exchange included whereas in the curve formed by open squares the $Cd^{2+}$ ion-exchange was not included.
Figure 3:
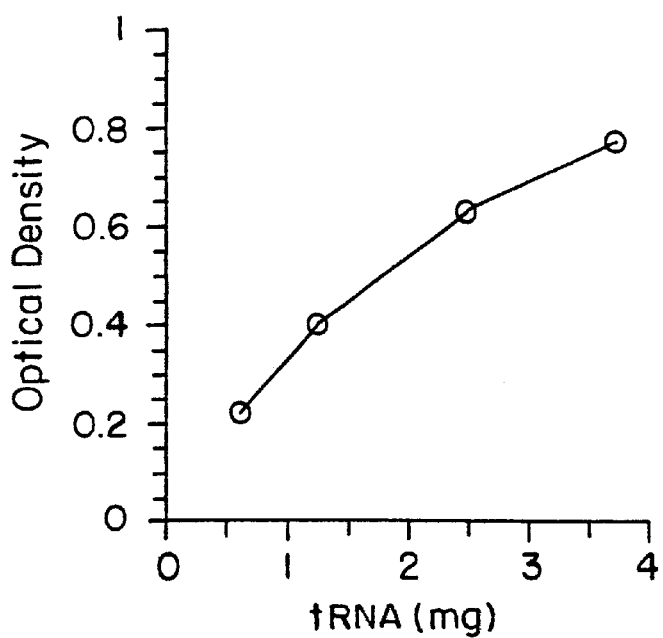
FIG. 3 is a plot of optical density at 355 nm versus tRNA concentration for a tRNA (BRL) polyacrylamide composite of the invention.

The optical absorption spectra of the nanoparticle composite can be seen in FIG. 2. The sharp peak at 355 nm is indicative of a narrow particle distribution in addition to being blue-shifted as compared to bulk CdS. The curve with open squares represents a control experiment identical to the experiment in the curve with open circles, but minus the $Cd^{2+}$. The absorption below 320 nm is due to the tRNA. The results of varying tRNA concentration (hence particle size concentration) can be seen in FIG. 3. Absorption at 355 nm increases with tRNA concentration. The absorption edge of all samples started at 452 nm.

This work sets the stage for incorporation of exact molecular weight polymers such as recombinant DNA derived proteins or exact-size nucleic acid polymers. This can result in tailored monodisperse particles that can be utilized in future nonlinear optical experimental studies.

The individual interactive polymers 10 serve as nucleation sites for formation of CdS nanometer size particles (such as CdS). In this example, the narrow molecular weight distribution, tertiary structure, and small size leads to a very narrow CdS particle distribution with an estimated diameter of 2.0 nanometers based on a particle-in-a-box approximation. TEM analysis may be used to confirm size and to determine shape and uniformity. X-ray crystallography may be used to determine crystal morphology.

The composite films 20 can be very stable. The optical absorption spectrums taken one month after formation are identical in shape and the absorption at 355 nm remains the same compared to films measured immediately after formation. Any coalescence would have resulted in a peak broadening as being red-shifted. During the fabrication process (after CdS formation) the films are dried at room temperature, which results in a tight compact structure that restricts particle mobility.

Z-scan measurements were made to determine the $\chi^3$ of the CdS particles 22 in their host medium 20. As a control, the $\chi^3$ of the host was measured independently. The data was collected from several locations across a thin (60 mm) film 3" by 0.5" in size. The illumination beam ($\lambda$=514 nm) was focused using a 6.29 cm focal length beam and the incident power was 350 mW. The beam waist was calculated to be 86 mm in diameter and the power density at the focal plane of the lens was 29.98 mW/m². It was found that the $\chi^3$ of the substrate was $-10.4 \times 10^{-6}$ esu (it is not unusual for thermally induced $\chi^3$ to be negative). With the CdS particles present, the sets of Z-scan measurements taken resulted in a value for $\chi^3$ of $-6.7 \times 10^{-6}$ esu. This result indicates that the intrinsic $\chi^3$ of the CdS particles 22 (quantum dots) is $+3.7 \times 10^{-6}$ esu at this wavelength. On-going measurements are being made of these samples as a function of illuminating wavelength, in order to determine whether the expected size dependence is observed for CdS assuming a quantum confinement mechanism dominates the $\chi^3$ being measured in this way.

The biomolecular self-assembly process described herein provides a method for fabricating composites of uniform size and shape utilizing exact-size nucleic acid or rDNA derived protein polymers. A composite constructed in this manner should provide a much more dramatic index change, due to the narrower absorption peak of the particle distribution, and hence yield a march larger effective $\chi^3$.

Figure 6:
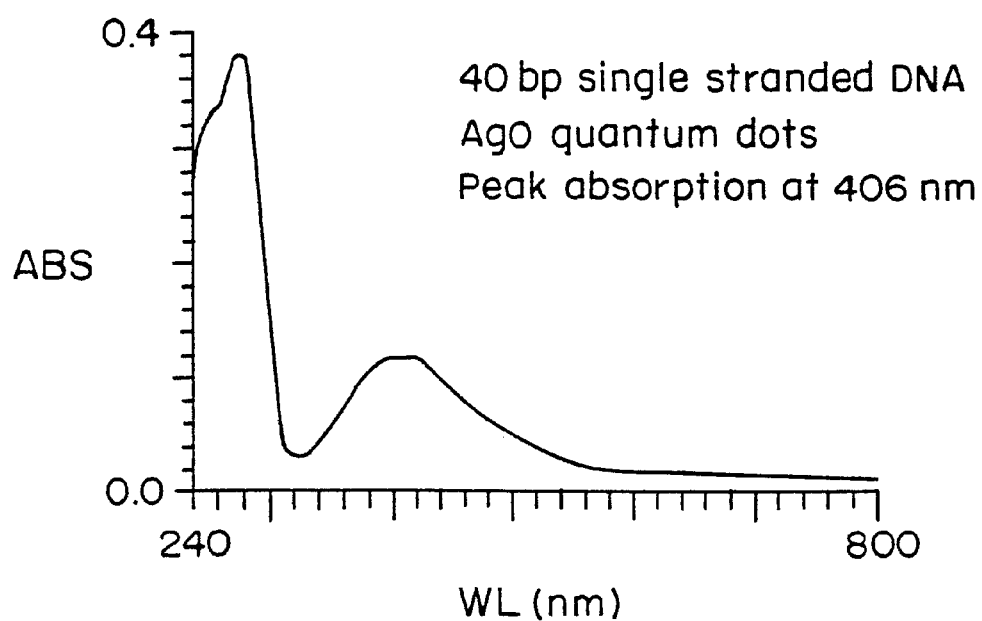
FIG. 6 is an absorption curve for single stranded DNA with AgO quantum dots.

While the invention has been particularly shown and described herein with reference to the preferred embodiment thereof, it will be understood by those skilled in the art that various changes in form and details may be made without departing from the spirit and scope of the invention as defined by the appended claims. For example, as depicted in FIG. 6, protein polymers other than rDNA may be used for biomolecular self assembly, the precipitation process is not limited to sulfides nor is the ion-exchange process limited to cadmium ion-exchange.

EXEMPLIFICATION

Composite films were made by dissolving the nucleic acids in a 29:1 acrylamide:bis acrylamide monomer solution at concentrations ranging from 1 to 20 mg/mL. Molds 1 cm×5 cm were constructed and the solution was poured between the facing plates. One of these plates was quartz that was treated with an acidic solution of γ-methacrylozypropyl-trimethoxysilane (Sigma) so that the polyacrylamide films would bond covalently to the quartz and thus would not shrink upon drying. The facing plate was treated with Sigmakote® (Sigma), a coating that repelled the gel and prevented tearing of the film upon disassembly. This procedure is similar to that reported by Garoff, 1981.

After gelation, the molds were disassembled and the films were fixed in 10% acetic acid for 20 minutes. Cadmium sulfide quantum dots were synthesized by soaking the film in approximately 50 mL of 100 mM solution of cadmium sulfate (Baker) for 5 minutes, washing 3 to 10 minutes in 50 mL of Milli-Q water, soaking for another 5 minutes in 50 mL of 100 mM sodium sulfide solution (Sigma), and then washed again for 5 to 10 minutes in 50 mL of Milli-Q water.

Metallic silver nanoparticles were synthesized using a modified silver stain procedure as reported by Promega. After fixing, the gels were soaked in 0.2% silver nitrate (Promega or Aldrich) solution for 30 minutes with constant agitation. They were then dipped in Milli-Q water for 5 to 10 seconds and then placed in cold (4 to 8° C.) developer solution A (0.05% formaldehyde, 2.5% sodium carbonate, 4 μM sodium thiosulfate, all Promega) for 2 to 5 minutes. The films were then placed in the 10% acetic acid solution for 5 minutes. Next, the gels were placed in developer solution B (dilute hydroquinone, Kodak) for 2 to 5 minutes. Again, the development was stopped by placing in cold (4 to 8° C.) 10% acetic acid solution. The films were rinsed for 5 to 10 minutes in Milli-Q water.

Figure 4:
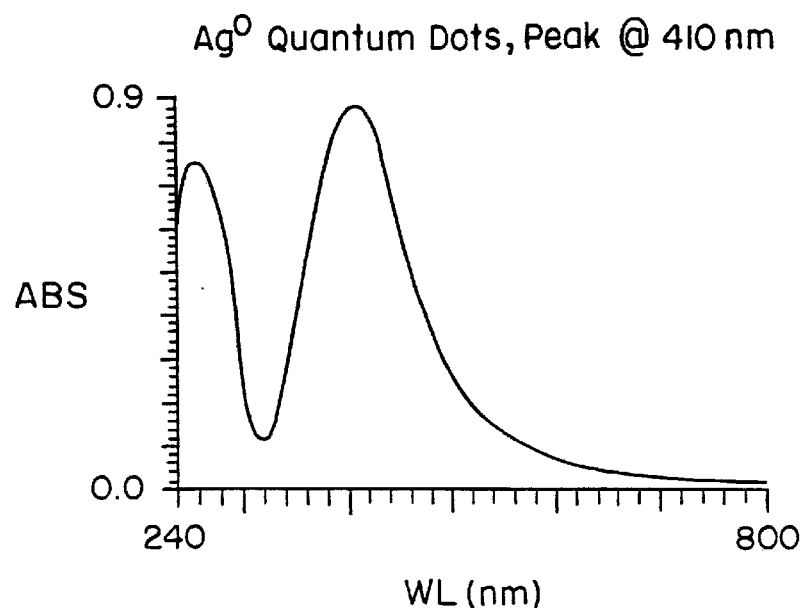
FIG. 4 is an absorption curve for Ag metal quantum dots.
Figure 5:
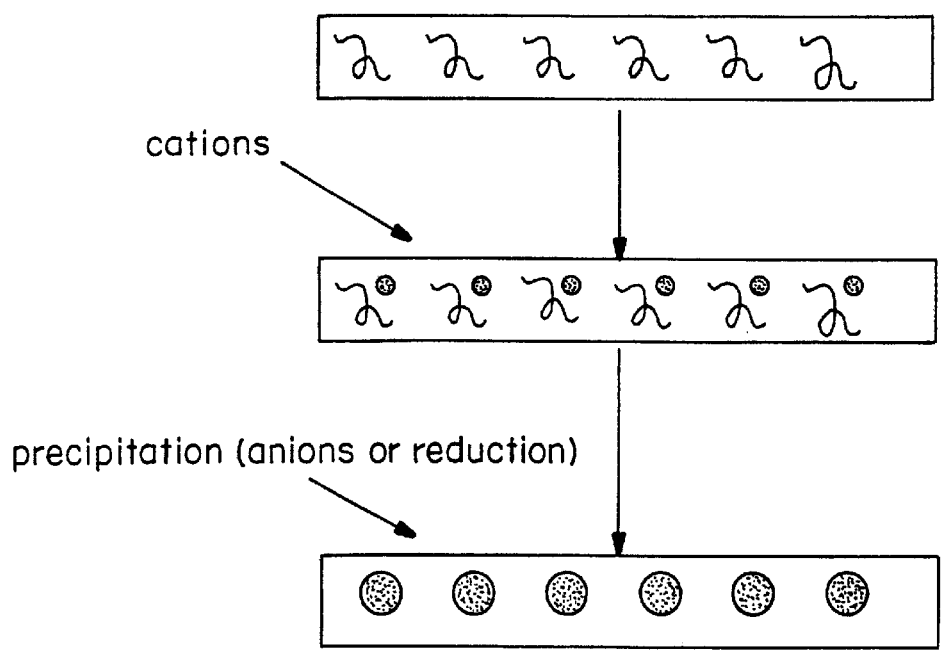
FIG. 5 is a schematic of biomimetic synthesis of quantum dot composites.

Absorbance scans of the resulting films were done on a Genesis-5 (Milton-Roy) Spectrophotometer between the desired wavelengths. FIGS. 4 and 6 demonstrate measurements of the non-linear susceptibilities of silver composites using the Z-scan method.

What is claimed is:

1. A quantum dot composite structure exhibiting third order optical nonlinearities comprised of a polymeric gel matrix, a plurality of biopolymer molecules dispersed within the matrix, and a plurality of nanoparticles in contact with at least one of the biopolymer molecules.

2. The composite structure of claim 1, wherein the matrix is at a solid support.

3. The composite structure of claim 1, wherein said particles are comprised of a compound of a first charged element and a precipitating element.

4. The composite structure of claim 3 wherein the first charged element is a cation.

5. The composite structure of claim 3 wherein the precipitating element is an anion or a reducing agent.

6. The composite structure of claim 3 wherein the first charged element is an anion and the precipitating element is a cation.

7. The composite structure of claim 3 wherein the first charged element is a metal ion.

8. The composite structure of claim 3 wherein the first charged element is a Cd ion.

9. The composite structure of claim 1, wherein at least one of the nanoparticles comprises a metal cation.

10. The composite structure of claim 9, wherein the metal cation is selected from the group consisting of the transition metals, the lanthanide metals, and the actinide metals.

11. The composite structure of claim 10, wherein the metal cation is a transition metal selected from the group consisting of cadmium, silver, and iron.

12. The composite structure of claim 1, wherein at least one of the nanoparticles comprises a component which is substantially insoluble in water.

13. The composite structure of claim 12, wherein the component comprises an oxide or a sulfide.

14. The composite structure of claim 13, wherein the component comprises cadmium sulfide.

15. The composite structure of claim 1, wherein at least one of the nanoparticles comprises a metal component.

16. The composite structure of claim 15, wherein at least one of the nanoparticles comprises silver.

17. The composite structure of claim 1, wherein the matrix comprises polyacrylamide.

18. The composite structure of claim 12, wherein the matrix comprises siloxane.

19. The composite structure of claim 1, wherein the biopolymer molecules are polypeptides or nucleic acids.

20. The composite structure of claim 19, wherein the nucleic acids are tRNA.

21. The composite structure of claim 19, wherein the nucleic acid is DNA or a derivative of DNA.

22. The composite of claim 1, wherein said composite is formed by a method comprising the steps of:

a) contacting a plurality of biopolymer molecules with metal cations, said biopolymer molecules being dispersed within a polymer gel matrix; and b) precipitating the metal cations, thereby forming nanoparticles.

23. The composite of claim 22, wherein the metal cations are precipitated by anions.

24. The composite of claim 22, wherein the metal cations are precipitated by a reducing agent.

25. A composite film comprised of a plurality of tRNA molecules dispersed in a polymer gel matrix and a plurality of cadmium sulfide nanoparticles in contact with at least one of the tRNA molecules.

* * * * *